United States Patent [19]

Niki et al.

[11] Patent Number: 4,940,017
[45] Date of Patent: Jul. 10, 1990

[54] CAGE, ESPECIALLY FOR SMALL EXPERIMENTAL ANIMALS

[76] Inventors: Etsuko Niki; Motohiro Niki, both of 2-22-11, Yushima, Bunkyo-ku, Tokyo-To, Japan; Kap J. Lee, R.R. #1, Box 123, Grand Forks, N. Dak. 58201; Misako Niki; Mieko Niki, both of 2-22-11, Yushima, Bunkyo-ku, Tokyo-To, Japan

[21] Appl. No.: 256,309

[22] Filed: Oct. 11, 1988

[30] Foreign Application Priority Data

Oct. 30, 1987 [JP] Japan ................. 62-273318

[51] Int. Cl.⁵ ............................................. A01K 1/03
[52] U.S. Cl. ...................................... 119/18; 119/72.5
[58] Field of Search ................ 119/17, 18, 72, 72.5, 119/71, 15; 248/206.2, 206.3, 206.4, 309.3, 362, 363; 604/176, 175, 171, 268

[56] References Cited

U.S. PATENT DOCUMENTS

| 2,988,044 | 6/1961 | Adelberg et al. | 119/18 |
| 3,397,676 | 8/1968 | Barney | 119/18 X |
| 3,469,571 | 9/1969 | Vass | 604/176 X |
| 3,924,571 | 12/1975 | Holman | 119/15 |
| 4,346,672 | 8/1982 | Niki | 119/72.5 |
| 4,365,590 | 12/1982 | Ruggieri et al. | 119/17 X |
| 4,699,088 | 10/1987 | Murray et al. | 119/18 |

FOREIGN PATENT DOCUMENTS 2305126 10/1976 France ................. 119/72.5

Primary Examiner—Robert P. Swiatek
Assistant Examiner—Todd E. Manahan
Attorney, Agent, or Firm—Ladas & Parry

[57] ABSTRACT

A cage well suited for confining and rearing mice, rats and like relatively small animals in a germ free, hygienic atmosphere for experimentation purposes. Included is a boxlike casing with its open top closed by a wirework inner lid and further hermetically closed by a solid outer lid. A water dispenser for feeding the confined animal has a spout extending into the casing through a clearance hole in its wall. For connecting the spout to the casing and for hermetically closing the clearance hole, an elastic connector cup is fitted over the spout and held against the outer surface of the casing wall. An air supply conduit for supplying germ free air into the casing, and an exhaust conduit for drawing air from within the casing, both extending into the casing through additional clearance holes defined therein, also have similar connector cups mounted thereon. All the clearance holes can be hermetically sealed simply as the connector cups are relatively pressed against the casing.

10 Claims, 3 Drawing Sheets

CAGE, ESPECIALLY FOR SMALL EXPERIMENTAL ANIMALS

BACKGROUND OF THE INVENTION

This invention relates to cages for confining animals, particularly to those for experimental animals of smaller size such as mice and rats. More specifically, the invention deals with a hermetically sealed, ventilated cage suitable for confining and rearing relatively small experimental animals in a germ free, hygienically favorable environment. The cage in accordance with the invention lends itself to advantageous use where a multiplicity (e.g. tens or even hundreds) of such cages are arranged in columns and rows.

The laboratory animal cage has been known and used extensively which comprises a molded plastic casing or enclosure in the form of an open top box, with a wirework lid closing the open top of the casisng for confining an experimental animal or animals. For feeding the confined animal, a water dispenser has been employed which has an elongate spout inserted in the casing through a hole formed in a side or end wall of the casing. U.S. Pat. No. 4,346,672 to Niki describes and claims an example of such water dispenser.

One of the problems heretofore encountered with this type of cage is the sealing of the joint between the spout of the water dispenser and the edge of the casing bounding the hole receiving the spout. Conventionally, the hole has been shaped and sized for a close fit with the dispenser spout. However, since the plastic casing is usually autoclaved preparatory to use, the hole has been susceptible to thermal deformation, making it difficult or impossible to closely insert the dispenser spout in the hole. Such difficulty has become even more pronounced in the case of large scale experiments involving the use of tens or hundreds of animals that must be kept in separate cages.

Another problem with the prior art cage also arises in connection with the water dispenser, which is so constructed as to dispense water as the caged animal prods at the tip of the dispenser spout. However, moving about within the cage, the animal may touch or sport with the spout, with the consequent leaking of water therefrom. Moreover, because of the construction of the prior art water dispenser, water has also been easy to spill from the spout even when the animal is drinking therefrom in the normal manner. Such water spillage is objectionable from the standpoint of animal hygiene because, collecting on the bottom of the casing, the water can chill the body of the animal and so reduce its weight. The loss of weight can seriously affect the experiment if, for example, drugs are being tested on the animal.

The supply of water from the spout can also be easily impeded by the wood chips usually laid on the bottom of the cage in rearing mice, rats or the like. The prior art cage construction has allowed the wood chips to pile up near the tip of the dispenser spout with the movement of the caged animal. Such a pile of wood chips can easily touch and activate the dispenser spout thereby causing water spillage therefrom. Further the water dispenser has been prone to malfunctioning, failing to discharge water, as the wood chips are caught in the tip of the spout. The possible result has been the death of the animal in the worst case, totally invalidating the experiment.

It has also been proposed to hermetically close the open top casing of the cage with a solid outer lid, which overlies a wirework inner lid, and to ventilate the interior of the casing with germ free air. The caged animals may be infected with germs. The air exhausted from within the cage may contain such germs. Should such air be allowed to fill the laborary, the experimenters might be infected with the germs or might develop an allergy. It is therefore important that the cage be sealed hermetically and be ventilated so as not to contaminate the laboratory air.

Thus the ventilation system requires not only a conduit for supplying germ free air into the cage but also another conduit for exhausting the possibly contaminated air from within the cage. Further, as these conduits are inserted in the cage through holes formed therein, the gaps between the conduits and the edges of the holes must be sealed against the escape of the contaminated cage air. As far as the applicant is aware, there has been suggested no truly satisfactory method of readily connecting the air supply and exhaust conduits, as well as the spout of the water dispenser, to the cage so as to prevent the outflow of the contaminated air therefrom.

SUMMARY OF THE INVENTION

It is among the objects of the invention to provide a cage of the type having a water dispenser for feeding the caged animal, so made that the spout of the water dispenser can be readily connected to and disconnected from the cage.

Another object of the invention is to prevent the leakage or spillage of water from the spout of the water dispenser into the cage in the face of the movement of the caged animal and of the presence of wood chips or the like within the cage.

A further object of the invention is to provide a hermetically sealed cage which is effectively ventilated without the possibility of contaminating the laborary air.

A further object of the invention is to provide a hermetrically sealed, ventilated cage so made that the spout of the water dispenser, as well as the conduits needed for cage ventilation, can be readily hermetically coupled to the cage against the hazard of contaminating the laboratory air with the germs escaping from within the cage.

A still further object of the invention is to confine and rear experimental animals in a germ free, hygienic environment and to greatly alleviates the trouble heretofore imposed on experimenters in dealing with laboratory animals, especially with a large number of them.

Briefly stated in its perhaps broadcast aspect, the invention concerns a cage especially well suited for confining experimental animals, comprising enclosure means including a casing for confining an animal. For supplying water to the confined animal a water dispenser is provided which has a spout inserted into the enclosure means through a hole in the casing. Mounted to the spout of the water dispenser, a connector cupt of elastic material has an open end held against an outer surface of the casing.

Thus the casing and the water dispenser can be readily interconnected as the elastic connector cup is relatively pressed against the outer surface of the casing, with the dispenser spout first inserted in the casing through the hole therein. The elastic connector cup serves the additional purpose of hermetically sealing the gap or clearance between the dispenser spout and the edge of the casing bounding the hole.

For the ventilation of the cage with germ free air, an air supply conduit and an exhaust conduit may be inserted in second and third holes formed in the casing, preferably in the same wall of the casing as the first recited hole for receiving the dispenser spout. Connector cups of elastic material, similar to the one on the dispenser spout, may also be mounted to the conduits for connecting them to the casing and for hermetically closing the gaps or clearances between the conduits and the edges of the casing bounding the two additional holes.

In practice the water dispenser and the air supply and exhaust conduits may be fixedly supported in their preassigned relative positions, with the connector cups permanently mounted thereon. The cage, placed on a suitable shelf or the like, may be pushed toward the fixed dispenser spout and air supply and exhaust conduits so as to receive them into the holes in the casing. The holes will be hermetically closed as the cage is pressed against the elastic connector cups on the dispenser spout and the air conduits. The cage may be simply moved away from the dispenser spout and the air conduits for disconnection therefrom, leaving the connector cups on the dispenser spout and air conduits.

In order to prevent water spillage from the tip of the dispenser spout into the cage, the dispenser spout comprises a supply tube for conveying water to be fed to the animal, and a recovery tube surrounding the supply tube with a clearance therebetween. The water spilling from the tip of the supply tube will flow into the recovery tube, thereby to be discharged outside the cage, if the tip of the supply tube is somewhat retracted into the recovery tube and if the dispenser spout is angled upwardly as it extends into the cage.

For the provision of a hermetically sealed, ventilated cage in accordance with the invention, there is typically employed a substantially boxlike, open top casing together with a solid outer lid hermetically closing the open top of the casing in overlying relation to a wirework inner lid. The invention features a wirework or like openwork partition depending from the inner lid and dividing the interior of the casing into an animal compartment for accommodating an animal, and a drinking compartment into which the spout of the water dispenser extends through a hole in the casing. The openwork partition has defined therein an opening through which the animal in the animal compartment may poke its head into the drinking compartment for drinking water from the dispenser spout.

Since the openwork partition normally separates the caged animal from the dispenser spout, and since wood chips may be laid only in the animal compartment, there is little or no likelihood of the wood chips piling up in the immediate vicinity of the dispenser spout, or of the wood chips otherwise hampering the normal functioning of the water dispenser. Nor will the caged animal sport with the dispenser spout. Water spillage from the dispenser spout can thus be reduced to a minimum.

Altogther, the improved cage construction in accordance with the invention is well calculated for the hygiene of the animals to be caged, and for the ease of rearing the caged animals and of handling the cage, particularly where a multiplicity of such cages are used simultaneously.

The above and other objects, features and advantages of the invention and the manner of attaining them will become more apparent, and the invention itself will best be understood, from a study of the following description and appended claims, with reference had to the attached drawings showing some preferred embodiments of the invention.

DESCRIPTION OF THE PREFERRED EMBODIMENTS

Figure 1:
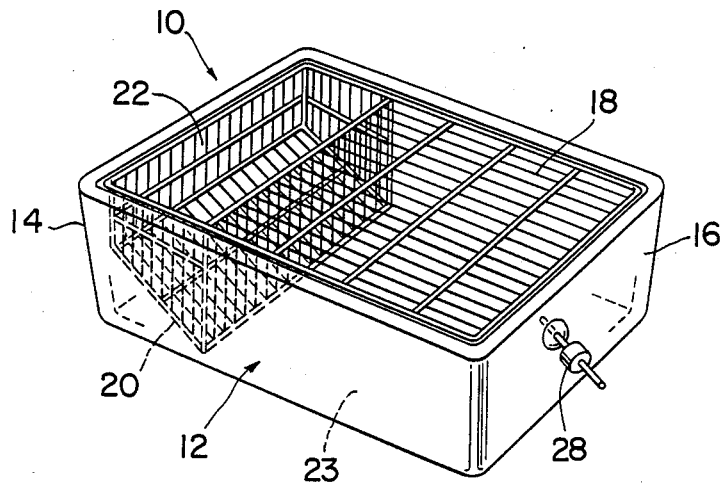
FIG. 1 is a perspective view of an experimental animal cage embodying the novel concepts of the invention.

The cage according to the invention will now be described in terms of a first embodiment illustrated in FIGS. 1-3 as adapted for confining and feeding a relatively small experimental animal such as a mouse or rat. Generally designated 10 in FIG. 1, the representative cage includes a casing 12 molded in the form of an open top box from a plastic. The casing 12 has a front wall 14, shown directed to the left in FIG. 1, and a rear wall 16. Closing the open top of the casing 12 is an openwork lid 18, preferably in the form of wire grating.

Figure 2:
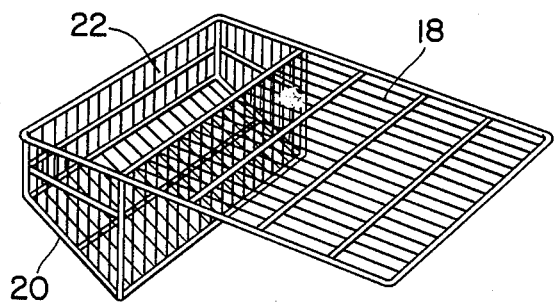
FIG. 2 is a perspective view of the wirework lid, formed integral with a partition assembly defining a feed compartment, used in the cage of FIG. 1.

As pictured by itself in FIG. 2, the lid 18 is formed integral with an open top, bottomed partition assembly 20, which also is preferably in the form of wirework, in this particular embodiment. The partition assembly 20 bounds off a feed compartment 22 within the casing 12 and in the vicinity of its front wall 14 for receiving feed to be given to the caged animal.

Closed by the lid 18, the rest of the interior of the casing 12 provides an animal compartment 23 for confining a desired experimental animal or animals. It is thus seen that, in this embodiment, part of the casing 12 and the lid 18 constitutes an enclosure defining the space for accommodating a laboratory animal.

Figure 3:
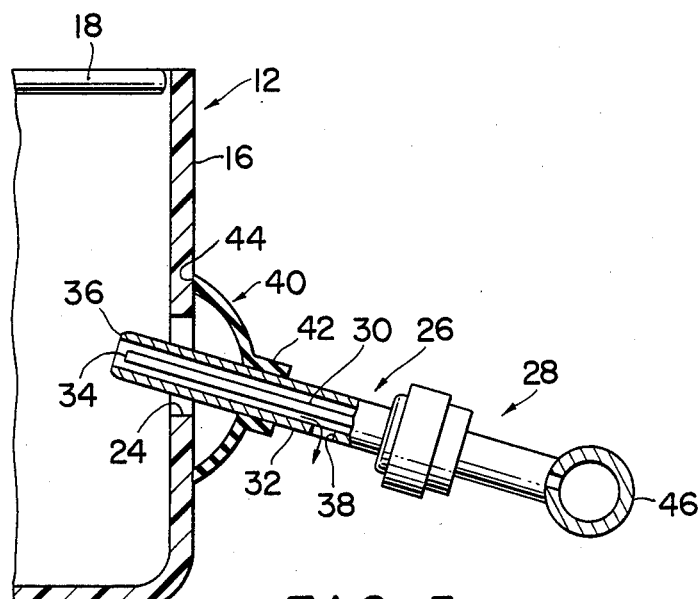
FIG. 3 is an enlarged, fragmentary vertical section through the cage of FIG. 1, showing in particular how the water dispenser is coupled to the casing.
Figure 6:
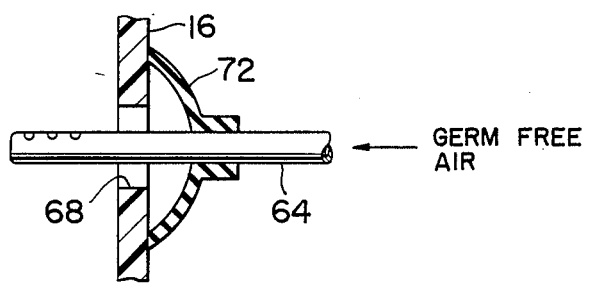
FIG. 6 is an enlarged, fragmentary vertical section through the cage of FIG. 4, showing in particular how the air supply conduit is sealingly coupled to the casing.
Figure 7:
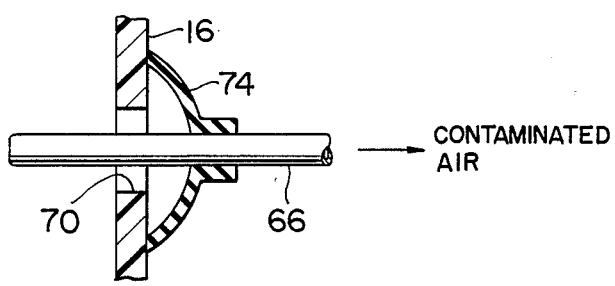
FIG. 7 is a view similar to FIG. 6 but showing how the exhaust conduit is sealingly coupled to the casing.

As drawn on an enlarged scale in FIG. 3, the casing 12 has a hole 24 formed in its rear wall 16 for insertion of the spout 26 of a water dispenser 28 in the animal compartment 23. The water dispenser 28 can be generally of the type described and claimed in the previously cited Niki U.S. Pat. No. 4,346,672. Thus the dispenser spout 26 comprises a supply tube 30 for conveying water to be dispensed, and a recovery tube 32 coaxially surrounding the supply tube 30 with a clearance therebetween. The supply tube 30 has a water exit end 34, and the recovery tube 32 has a water recovery end 36, which ends are both positioned within the casing 12. Water will be dispensed from the water exit end 34 of the supply tube 30 at a controlled rate as the caged animal thrusts its mouth at the supply tube end 34.

According to the invention, the water exit end 34 of the supply tube 30 is recessed into the recovery tube 32, only to such an extent as to permit access and actuation by the caged animal. Further the dispenser spout 26 as a whole is angled upwardly as it extends into the casing 12.

Thus, as the animal drinks water from the water exit end 34 of the supply tube 30, any water spilling therefrom will be mostly recovered by the recovery tube 32 and will flow by gravity through the space between supply tube 30 and recovery tube 32, instead of falling on the bottom of the casing 12. The recovery tube 32 has a discharge hole 38 for discharging the recovered water to the outside of the casing 12. The spilling of water onto the bottom of the casing 12 is undesirable because it wets the wood chips normally laid on the casing bottom and so seriously affects the health of the animal. Experiment has proved that the illustrated construction and angular arrangement of the water dispenser 28 can drastically reduce water spillage taking place as the animal take sips therefrom.

FIG. 3 also clearly reveals a connector cup 40 of rubber or like elastic material constituting another feature of the invention. The connector cup 40 has a base end 42 hermetically fitted over the spout 26 of the water dispenser 28, and an open end 44 elastically held against the outer surface of the rear wall 16 of the casing 12. The open end 44 of the connector cup 40 is of greater diameter than the hole 24 in the casing rear wall 16.

In the use of a plurality of multiplicity of cages 10, each constructed as in the foregoing, in side by side arrangement, as many water dispensers 28 may be coupled to a common fixed water conduit 46. For coupling the casing 12 to the respective water dispensers 28, the former may be pushed back toward the latter. This may involve slidingly shifting the cages on a horizontal axis between a plurality of positions. It is thus clear that the cages may be slidingly shifted horizontally so that the outer surfaces of their casings are pressed in contact with the connector cups. The spouts 26 of the water dispensers will be inserted in the casings 12 through the holes 24 in their rear walls 16, it being understood that the holes 24 are large enough to easily receive the angled dispenser spouts in the course of such backward travel of the casings. The proper connection between casings 12 and water dispensers 28 will be established as the the rear walls 16 of the casings 12 are pressed against the open ends 44 of the connector cups 40 on the dispenser spouts 26. It will also be appreciated that no other means than the connector cups 40 are required for stopping the backward travel of the casings 12 in preassigned positions with respect to the water dispensers 28.

The disconnection of the casings 12 from the water dispensers 28 is easy. The casings 12 may simply be pulled forwardly. The connector cups 40 will readily release the casings 12, permitting withdrawl of the dispenser spouts 26 from within the casings.

ANOTHER EMBODIMENT

The connector cup of the above disclosed cage 10 serves, by virtue of its elasticity, the additional purpose of hermetically closing the gap or clearance between the casing edge bounding the hole and the dispenser spout inserted therein. Thus, in the second embodiment of the invention illustrated in FIGS. 4–7, the connector cup is advantageously incorporated in a hermetically sealed, ventilated cage.

Figure 4:
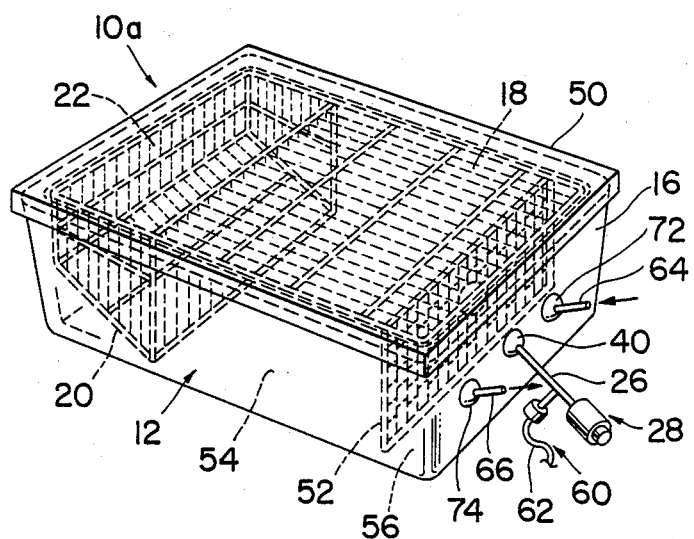
FIG. 4 is a perspective view of the another preferred form of experimental animal cage in accordance with the invention.

With reference to FIG. 4 the hermetically sealed, ventilated cage 10a also comprises the casing 12 in the form of an open top box. The open top of the casing 12 is closed both by the wirework inner lid 18 and, hermetically, by a solid outer lid 50.

Figure 5:
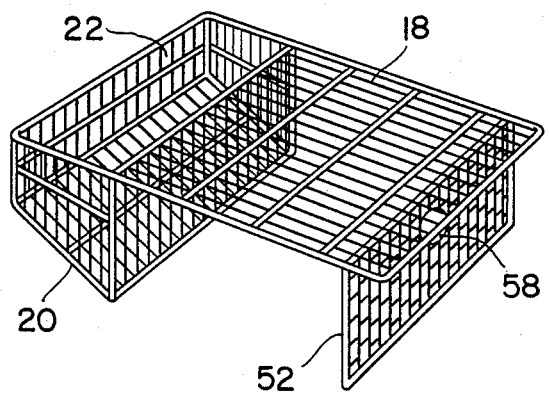
FIG. 5 is a perspective view of the wirework inner lid used in the cage of FIG. 4, the inner lid being formed integral with the partition assembly defining a feed compartment and, additionally, with a partition dividing the interior of the casing into an animal compartment and a drinking compartment.

As will be noted from FIG. 5, the inner lid 18 is analogous with the lid 18 of the cage 10 in having the wirework partition assembly 20 bounding the feed compartment 22. In this alternative embodiment, however, the inner lid 18 is further formed integral with a wirework partition 52 depending therefrom. Bottomed against the casing 12, the partition 52 divides the interior of the casing into an animal compartment 54 for housing an animal, and a drinking compartment 56 lying next to the rear wall 16 of the casing. The spout 26 of the water dispenser 28 extends into the drinking compartment 56 through the casing rear wall 16. The water dispenser 28, including the spout 26, is of the same construction as that set forth with reference to the FIGS. 1-3 embodiment. The partition 52 has an opening 58 formed approximately centrally therein to enable the animal in the animal compartment 54 to drink water from the dispenser spout 26 in the drinking compartment 56.

The openwork partition 52 serves to separate not only the caged animal but also the wood chips from the dispenser spout 26. The water dispenser 28 should therefore not malfunction as the partition 52 prevents the animal from piling up or throwing the wood chips into touch with its spout 26. The spilling of water from the dispenser spout 26 will also be reduced as the partition 52 serves the additional purpose of preventing the animal from sporting with the spout.

Although separated from the dispenser spout 26 as in the foregoing, the caged animal can nevertheless drink water therefrom as it pokes its head toward the drinking compartment 56 through the opening 58 in the partition 52. The size of the opening 58 and the distance between the partition 52 and the tip of the dispenser spout 26 may be suitably determined to permit the animal to drink water in this manner.

The water dispenser 28 has its spout 26 inserted in the clearance hole in the rear wall 16 of the casing 12 and joined thereto by the connector cup 40, just as has been described with reference to FIG. 3 in connection with the first disclosed cage 10.

In this second embodiment, however, the water dispenser 28 is shown to additionally comprise a discharge tube 60, FIG. 4, branching from the spout 26 and communicating with the space between the supply tube and recovery tube. The recovered water is therefore discharged through the discharge tube 60.

It will also be noted from FIG. 4 that the discharge tube 60 is formed to include a U-shaped portion 62 constituting a water trap. The water trapped in this U-shaped portion of the dishcarge tube serves to maintain the interior of the casing 12 out of communication with the atmosphere.

For the ventillation of the cage 10a there are employed an air supply conduit 64 for the introduction of germ free air into the casing, and an exhaust conduit 66 for the withdrawal of contaminated air from within the casing. The contaminated air should be filtered for removal of the germs that may be contained in such air, prior to being exhausted to the atmosphere. These conduits 64 and 66 are inserted in the casing 12 through second and third clearance holes 68 and 70, respectively, formed in its rear wall 16. Second and third connector cups 72 and 74 of elastic material are hermetically mounted to the conduits 64 and 66, respectively, and have their open ends held against the outer surface of the casing rear wall 16. All the connector cups 40, 72 and 74 used in this embodiment can be of the same material and of the same construction.

Preferably, the water dispenser 28, air supply conduit 64 and exhaust conduit 66 may all be fixedly supported in preassigned positions with respect to the three associatd clearance holes 24, 68 and 70 in the casing rear wall 16, with the three connector cups 40, 72 and 74 firmly mounted thereon. As the casing 12 is pushed back, the dispenser spout 26 and conduits 64 and 66 will be inserted in the respective holes 24, 68 and 70. Further, with the continued rearward travel of the casing 12, the clearances will be airtightly closed by the connector cups 40, 72 and 74 as their open ends are elastically held against the outer surface of the casing rear wall 16. The connector cups will hermetically close the clearances even if the casing holes 24, 68 and 70 are somewhat distorted or if there is some misalignment between these holes and the dispenser spout 26 and conduits 64 and 66. Of course, the connector cups serve also to mechanically connect the dispsenser spout 26 and conduits 64 and 66 to the casing 12.

It will therefore be appreciated that the interior of the cage 10a is thoroughly sealed against the ingress or egress of atmospheric air and effectively ventilated with germ free air. Further, as the spilling of water from the dispenser spout into the cage is reduced to a minimum, the caged animal can be reared under the most hygienically desirable conditions, assuring proper experimentation with the animal.

Various changes may be made in the details of the illustrated cage constructions without departing from the scope of the invention.

What is claimed is:

1. A cage especially well suited for confining experimental animals, comprising:
   (a) horizontally slidingly shiftable enclosure means including a casing for confining an animal, said casing having a vertical side wall;
   (b) there being a hole defined in the side wall of the casing;
   (c) a water dispenser fixedly connected to a stationary water conduit and having a stationary spout inserted in the casing through the hole therein for supplying water to the confined animal; and
   (d) a connector cup of elastic material hermetically and fixedly mounted to the spout of the water dispenser, the connector cup having an open end held against an outer surface of said wall of the casing around said hole, said casing being held in position with the outer surface of the casing in pressed contact with the connector cup;
   (e) whereby the enclosure means and the water dispenser can be readily interconnected as the elastic connector cup is pressed against the outer surface of the casing with the shifting movement of the enclosure means toward the water dispenser.

2. The cage of claim 1 wherein the spout of the water dispenser comprises:
   (a) a supply tube for conveying water to be dispensed, the supply tube having a water exit end positioned within the enclosure means;
   (b) a recovery tube surrounding the supply tube with a clearance therebetween and having a water recovery end positioned within the enclosure means, the water recovery end of the recovery tube extending beyond the water exit end of the supply tube for recovering the water spilling therefrom into the space between the supply tube and the recovery tube; and
   (c) discharge means for discharging the recovered water from the space between the supply tube and the recovery tube to the outside of the enclosure means.

3. The cage of claim 2 wherein the spout of the water dispenser is angled upwardly as it extends into the casing, so that the recovered water flows by gravity through the space between the supply tube and the recovery tube toward the outside of the enclosure means.

4. The cage of claim 1 wherein the casing is substantially in the form of an open top box, and wherein the enclosure means further comprises an openwork lid closing the open top of the casing.

5. A hermetically sealed, ventilated cage for confining experimental animals or the like, comprising:
   (a) horizontally slidingly shiftable enclosure means including a casing and providing a hermetically sealed space for confining an animal, said casing having a vertical side wall with spaced-apart first, second, and third holes therethrough;
   (b) water supply means including a stationary spout inserted in the enclosure means through the first hole defined in the casing for supplying water to the confined animal;
   (c) a first connector cup of elastic material hermetically and fixedly mounted to the spout and held against the vertical side wall of the casing around said first hole so as to hermetically close the first hole;
   (d) a stationary air supply conduit inserted in the enclosure means through the second hole defined in the casing for supplying air into the hermetically sealed space;
   (e) a second connector cup of elastic material hermetically and fixedly mounted to the air supply conduit and held against the vertical side wall of the casing around said second hole so as to hermetically close the second hole;
   (f) a stationary exhaust conduit inserted in the enclosure means through the third hole defined in the casing for exhausting air from the hermetically sealed space; and
   (g) a third connector cup of elastic material hermetically and fixedly mounted to the exhaust conduit and held against the vertical side wall of the casing around said third hole so as to hermetically close the third hole;
   (h) said casing being slidingly shifted horizontally so that the casing is held in position with the outer surface of the casing in pressed contact with the connector cup.

6. The hermetically sealed, ventilated cage of claim 5 wherein the spout of the water supply means comprises:
   (a) a supply tube for conveying water to be dispensed, the supply tube having a water exit end positioned within the enclosure means;
   (b) a recovery tube surrounding the supply tube with a clearance therebetween and having a water recovery end positioned within the enclosure means, the water recovery end of the recovery tube extending beyond the water exit end of the supply tube for recovering the water spilling therefrom into the space between the supply tube and the recovery tube; and (c) a discharge tube branching from the recovery tube and communicating with the space between the supply tube and the recovery tube, the discharge tube having a water trap for maintaining the hermetically sealed space out of communication with the atmosphere.

7. The hermetically sealed, ventilated cage of claim 6 wherein the discharge tube is formed to include a U-shaped shaped portion to provide the water trap.

8. A cage especially well suited for confining and rearing relatively small experimental animals in a germ free, hygienically favorable environment, comprising:

(a) a substantially boxlike casing having an open top, a front wall and a rear wall;

(b) an openwork inner lid closing the open top of the casing;

(c) a solid outer lid overlying the inner lid and hermetically closing the open top of the casing;

(d) an openwork partition depending from the inner lid and dividing the interior of the casing into an animal compartment for accommodating an animal, and a drinking compartment positioned next to the rear wall of the casing;

(e) a water dispenser having a spout inserted in the drinking compartment through a first hole formed in the rear wall of the casing in order to supply water to the confined animal;

(f) there being an opening in the partition for enabling the animal in the animal compartment to drink water from the spout of the water dispenser in the drinking compartment;

(g) a first connector cup of elastic material mounted to the spout of the water dispenser and held against the outer surface of the rear wall of the casing both for connecting the spout to the casing and for hermetically closing the first hole;

(h) an air supply conduit inserted in the casing through a second hole formed in the rear wall of the casing in order to supply germ free air into the casing;

(i) a second connector cup of elastic material mounted to the air supply conduit and held against the outer surface of the rear wall of the casing both for connecting the air supply conduit to the casing and for hermetically closing the second hole;

(j) an exhaust conduit inserted in the casing through a third hole formed in the rear wall of the casing in order to exhaust air from within the casing; and (k) a third connector cup of elastic material mounted to the exhaust conduit and held against the outer surface of the rear wall of the casing both for connecting the exhaust conduit to the casing and for hermetically closing the third hole.

9. The cage of claim 8 wherein the openwork inner lid is formed to include additional openwork partition means defining within the casing a feed compartment for receiving feed for the confined animal, the feed compartment being located adjacent the front wall of the casing.

10. A cage especially well suited for confining experimental animals, comprising:

(a) enclosure means including a casing for confining an animal in the form of an open top box, and an openwork lid closing the open top of the casing;

(b) there being a hole defined in the casing;

(c) a water dispenser having a spout inserted in the casing through the hole therein for supplying water to the confined animal;

(d) a connector cup of elastic material mounted to the spout of the water dispenser, the connector cup having an open end held against an outer surface of the casing;

(e) whereby the enclosure means and the water dispenser can be readily interconnected as the elastic connector cup is relatively pressed against the outer surface of the casing with the movement of either of the enclosure means and the water dispenser toward the other; and (f) an openwork partition depending from the openwork lid and dividing the interior of the casing into an animal compartment for accommodating an animal, and a drinking compartment into which the spout of the water dispenser extends, there being an opening in the partition for enabling the animal in the animal compartment to drink water from the spout of the water dispenser in the drinking compartment.

* * * * *